United States Patent
Marissal et al.

(10) Patent No.: US 6,586,537 B2
(45) Date of Patent: Jul. 1, 2003

(54) PROCESS FOR MANUFACTURING AN OLEFIN POLYMER COMPOSITION

(75) Inventors: Daniel Marissal, Braine-le-Comte (BE); Brent Walworth, Gentbrugge (BE)

(73) Assignee: Solvay Polyolefins Europe-Belgium (Societe Anonyme), Brussels (BE)

(*) Notice: Subject to any disclaimer, the term of this patent is extended or adjusted under 35 U.S.C. 154(b) by 297 days.

(21) Appl. No.: 09/753,550

(22) Filed: Jan. 4, 2001

(65) Prior Publication Data
US 2001/0018499 A1 Aug. 30, 2001

(30) Foreign Application Priority Data
Jan. 18, 2000 (BE) .......................................... 2000/0035

(51) Int. Cl.[7] .................................................. C08F 2/04
(52) U.S. Cl. ............................. 526/70; 526/64; 526/65; 526/352; 526/348.5; 526/348.6
(58) Field of Search ............................. 526/70, 64, 65, 526/352, 348.6, 348.5

(56) References Cited

U.S. PATENT DOCUMENTS 3,816,383 A * 6/1974 Stotko ....................... 260/94.9
4,692,501 A   9/1987 Mineshima et al.
5,639,834 A * 6/1997 Debras et al. ................. 526/64
5,723,705 A   3/1998 Herrmann et al.

FOREIGN PATENT DOCUMENTS

| EP | 0 432 555 | 6/1991 |
|----|-----------|--------|
| EP | 0 891 990 | 1/1999 |
| EP | 0 897 934 | 2/1999 |
| GB | 850002    | 9/1960 |
| GB | 1147019   | 4/1969 |
| JP | 03 084013 | 4/1991 |

* cited by examiner

Primary Examiner—David W. Wu
Assistant Examiner—William Cheung
(74) Attorney, Agent, or Firm—Oblon, Spivak, McClelland, Maier & Neustadt, P.C.

(57) ABSTRACT

Process for manufacturing an olefin polymer composition in at least two polymerization reactors connected in series, in which the suspension of polymer in a diluant, formed in the first reactor, is sent into a hydrocyclone seperator in which, on the one hand, a stream comprising diluant and, on the other hand, a concentrated suspension of polymer particles are formed and separated. The concentrated suspension is then introduced into the subsequent polymerization reactor.

15 Claims, 3 Drawing Sheets

PROCESS FOR MANUFACTURING AN OLEFIN POLYMER COMPOSITION

Figure 1:
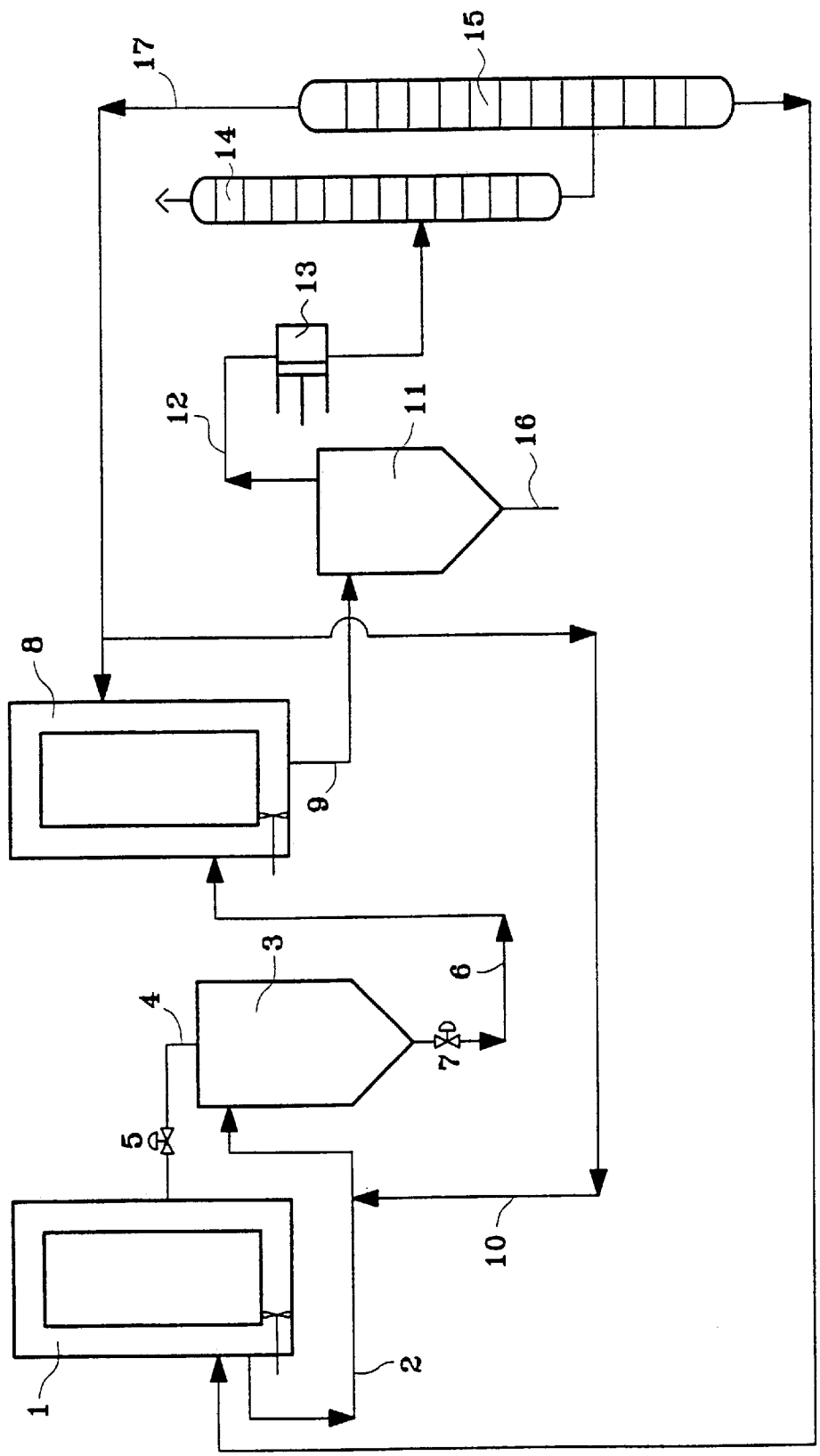

The present invention relates to a process for manufacturing an olefin polymer composition in at least two reactors connected in series. The invention also relates to a plant used for carrying out the process.

The use of at least two reactors placed in series to manufacture an olefin polymer composition is known from the prior art. The use of reactors in series makes it possible especially to set the polymerization conditions in each reactor and thus to obtain a composition comprising an intimate mixture of polymers having different characteristics, for example in terms of molecular mass and/or comonomer content. In order to be able to vary these characteristics, it is desirable to be able to control the polymerization mixture in each reactor independently and to remove from the polymerization mixture withdrawn from the first reactor the compounds which are undesirable in the subsequent polymerization reactor.

Several methods for treating the polymerization mixture coming from the first reactor have already been described. Patent Application EP-A-0 897 934 describes a process for preparing a polymer composition in which most of the hydrogen present in the suspension withdrawn from the first reactor is removed by relieving the pressure on the suspension before sending it into the second reactor. U.S. Pat. No. 5,639,834 describes a process for preparing a polymer composition in which the comonomer-rich suspension formed in the first reactor is drawn off from this reactor by means of settling legs mounted on the reactor, and then the concentrated suspension is sent to the second reactor in which the amount of comonomer is reduced. However, this process has drawbacks in that the periodic discharging from the reactor is difficult from the safety and reliability standpoint. This is because it is known that the valves isolating the settling legs easily become blocked over time. U.S. Pat. No. 4,692,501 describes a process in which the suspension formed in the first reactor is washed by a liquid countercurrent in an exchange zone before sending it into the second reactor. The drawback of this process is that great precautions have to be taken in order to prevent mixing of the withdrawn suspension and of the liquid added in the exchange zone.

The object of the present invention is to provide a process which does not have the aforementioned drawbacks.

The present invention therefore relates to a process for manufacturing an olefin polymer composition in at least two polymerization reactors connected in series, in which:

(a) at least one olefin is continuously polymerized in a first polymerization reactor in the presence of a diluant (D) and of a catalyst in order to produce a suspension (S) comprising the said diluant (D) and particles of an olefin polymer (A);

(b) some of the suspension (S) is drawn off from the reactor;

(c) the suspension drawn off is sent into a hydrocyclone separator in which, on the one hand, a stream (F) comprising diluant (D) and, on the other hand, a concentrated suspension (CS) of particles of polymer (A) are formed and separated;

(d) the stream (F) is drawn off from the hydrocyclone separator and at least partially recycled to the first polymerization reactor;

(e) the concentrated suspension (CS) is drawn off from the hydrocyclone separator and introduced into a subsequent polymerization reactor in which at least one olefin is polymerized in order to form an olefin polymer (B) and to produce a suspension (S') comprising the diluant (D) and particles of an olefin polymer composition comprising polymer (A) and polymer (B);

(f) the suspension (S') is drawn off from the subsequent polymerization reactor and the particles of the olefin polymer composition are separated from the suspension (S').

The term "olefin polymers" is understood to mean, in the present invention, both the homopolymers of an olefin and the copolymers of an olefin with one or more other olefins or other monomers copolymerizable with the olefin.

The olefin used in polymerization step (a) of the process according to the invention is generally chosen from among olefins comprising from 2 to 12 carbon atoms and mixtures thereof. The olefin is preferably chosen from among 1-olefins comprising from 2 to 8 carbon atoms, more particularly from among ethylene, propylene, 1-butene, 1-methylpentene, 1-hexene, 1-octene and mixtures thereof. It goes without saying that in step (a) several olefins can be used together or that other monomers copolymerizable with the olefins may be used so as to obtain olefin copolymers. Among other monomers copolymerizable with olefins, mention may especially be made of conjugated or unconjugated diolefins.

The diluant (D) used in the process according to the invention may be any diluant which is liquid under the polymerization conditions and in which most of the polymer formed is insoluble under the polymerization conditions. Suitable diluants are hydrocarbons. Aromatic and cyclic aliphatic hydrocarbons containing from 5 to 12 carbon atoms, such as toluene and cyclohexane, are very suitable. Preferred diluants are acyclic aliphatic hydrocarbons containing from 3 to 8 carbon atoms, such as pentane and hexane. Propane and isobutane are particularly preferred.

In one particular case, the diluant may be the olefin itself maintained in the liquid state below its saturation pressure.

In another particular case, the diluant may be maintained in its supercritical state.

The polymerization carried out in step (a) of the process according to the invention is generally carried out in the presence of a catalyst. Any catalyst allowing olefins to be polymerized may be used. By way of examples of such catalysts, mention may be made of catalysts of the Ziegler type, catalysts based on vanadium or chromium, metallocene catalysts and those based on transition metals of Groups 8 to 12 of the Periodic Table of the Elements. These catalysts may be supported on an inorganic or polymeric support.

It goes without saying that, in polymerization step (a), apart from the olefin(s) and the diluant, other compounds may be present, especially cocatalysts and agents for controlling the molecular mass, such as hydrogen.

The polymerization carried out in step (a) of the process may be performed under highly varied temperature and pressure conditions. In general, the polymerization is carried out at a temperature of from 20 to 150° C., preferably from 25 to 130° C. Usually, the polymerization is carried out at a pressure of from $10^5$ to $100 \times 10^5$ Pa, preferably from $10 \times 10$ to $55 \times 10^5$ Pa.

According to a variant of the process according to the invention, the polymerization carried out in step (a) is carried out in several polymerization reactors connected in series. In this case, the suspension (S) drawn off from the last polymerization reactor of this series is sent to step (b). The suspensions coming from each reactor preceding this last polymerization reactor may be drawn off and transferred in any known manner to the next reactor. For this purpose, it may also be advantageous to use hydrocyclone separators. If step (a) is carried out in several reactors in series, the stream (F) may be recycled to the last polymerization reactor. According to one advantageous embodiment, the stream (F) is recycled to a polymerization reactor preceding the last reactor.

In step (b) of the process according to the invention, some of the suspension formed in the reactor in step (a) is drawn off from this reactor. The amount of suspension drawn off from the reactor may vary widely.

In general, the amount of suspension drawn off from the reactor is adjusted so as to correspond to the production of polymer.

Apart from the diluent and the particles of olefin polymer (A), the suspension drawn off from the reactor may contain other compounds present or formed in the polymerization reactor. In general, the suspension comprises an amount of unpolymerized olefin.

In step (b), the suspension is preferably drawn off from the polymerization reactor continuously.

In step (c) of the process according to the invention, the suspension drawn off from the reactor in step (b) is sent into a hydrocyclone separator in which, on the one hand, a concentrated suspension (CS) of particles of polymer (A) and, on the other hand, a stream (F) comprising diluent (D) are formed and separated.

For the purposes of the present invention, the term "hydrocyclone separator" is understood to mean any apparatus which, under the action of a centrifugal force, makes it possible to separate from a suspension of solid particles, on the one hand, a liquid stream depleted in solid particles and, on the other hand, a stream rich in solid particles. Such apparatuses are well known; they have been described, for example, in Perry's Chemical Engineers' Handbook, McGraw-Hill 7th Edition, 1997, pages 19–24 to 19–28. It goes without saying that in the process according to the invention several hydrocyclone separators may be connected in series.

The pressure and temperature values in the hydrocyclone separator are generally adjusted so that most of the diluent present remains in liquid form. Preferably, the pressure and temperature are of the order of magnitude of those obtaining in the polymerization reactor.

According to one particular method of implementing the process according to the invention, the suspension drawn off in step (b) is diluted, in step (c), by means of a liquid (L) before it is introduced into the hydrocyclone separator. In the present invention, the term "liquid (L)" is understood to mean any compound which is liquid under the temperature and pressure conditions used in the polymerization reactor and in which most of the olefin polymer (A) formed is insoluble under these polymerization conditions. Advantageously, the liquid (L) consists essentially of diluent (D). In this case, the diluent added as liquid (L) may be fresh diluent, i.e. diluent not ever having been used or the polymerization, or recovered and purified diluent. The expression "recovered and purified diluent" is understood to mean diluent which has already been used for the polymerization, but which is purified so as to separate therefrom most of the compounds present or formed during the polymerization, such as the polymer particles and the olefin, so that it has a purity sufficient for it to be reused in the process.

The amount of diluent added as liquid (L) in this first method of implementing the process may vary widely.

In general, the amount of diluent added to the suspension is at least 0.1 l, preferably at least 0.5 l, per kg of particles of polymer (A) which are present in the suspension (S) drawn off from the reactor. In general, the amount of diluent added does not exceed 5 l, preferably does not exceed 3 l, per kg of particles of polymer (A) which are present in the suspension (S) drawn off from the reactor.

This method of implementing the process has the advantage of further decreasing the amount of compounds present or formed in the first reactor which is sent into the subsequent polymerization reactor.

The concentrated suspension (CS) formed in step (c) of the process according to the invention comprises, apart from the constituents of the suspension drawn off from the polymerization reactor, optionally, the liquid (L).

In step (d) of the process according to the invention, the stream (F) is drawn off from the hydrocyclone separator and at least partially recycled to the polymerization reactor.

In general, all of the stream (F) is recycled to the reactor. According to an alternative version of the process according to the invention, part of the stream (F) can be used to dilute the suspension (S) drawn off in step (b) of the process. In this case, the balance of the stream (F) is recycled to the reactor. The stream (F) may comprise, apart from the diluent and, optionally, the liquid (L), other compounds present or formed in the polymerization reactor. In general, the stream (F) comprises compounds present or formed in the reactor which are soluble in the diluent. The stream (F) usually comprises some olefin. The stream (F) may also comprise compounds present or formed in the reactor which are not soluble in the diluent, such as, for example, fine polymer particles.

In step (e) of the process according to the invention, the concentrated suspension (CS) is drawn off from the hydrocyclone separator and sent into a subsequent polymerization reactor in which at least one olefin is polymerized in order to form an olefin polymer (B).

According to one particular method of implementing the process according to the invention, in step (e), the pressure on the concentrated suspension (CS) drawn off from the hydrocyclone separator is firstly relieved before the suspension is introduced into the subsequent polymerization reactor. This method of implementing the process is particularly advantageous when the concentrated suspension (CS) contains hydrogen.

During the pressure relief, at least some of the hydrogen present in the concentrated suspension is removed. It goes without saying that, during the pressure relief, other components of the concentrated suspension (CS), such as the olefin(s), may also be partially removed. In general, some of the diluent is also vaporized.

The pressure relief is advantageously carried out at a temperature less than or equal to the polymerization temperature in the first reactor. The temperature at which the pressure relief is carried out is usually greater than 20° C. and preferably greater than 40° C. The pressure is relieved to less than the pressure in the first reactor. The relieved pressure is preferably less than $15 \times 10^5$ Pa and is usually at least $1 \times 10^5$ Pa.

This method of implementing the process has the advantage that the amount of hydrogen introduced into the subsequent polymerization reactor via the concentrated suspension (CS) is low, or even zero. In this way, the amount of hydrogen in the subsequent polymerization reactor can be controlled more precisely and consequently so can the molecular mass of polymer (B).

The olefin used in polymerization step (e) of the process according to the invention is generally chosen from among olefins containing from 2 to 12 carbon atoms and mixtures thereof. Preferably, the olefin is chosen from among 1-olefins containing from 2 to 8 carbon atoms, more particularly from among ethylene, propylene, 1-butene, 1-methylpentene, 1-hexene, 1-octene and mixtures thereof. It goes without saying that, in step (e), several olefins may be used together or that other monomers copolymerizable with the olefins may be used so as to obtain olefin copolymers. Among the other monomers copolymerizable with the olefins, mention may especially be made of conjugated or unconjugated diolefins.

The polymerization in step (e) of the process may be carried out under very variable temperature and pressure conditions. In general, the polymerization is carried out at a temperature of from 20 to 150° C., preferably from 25 to 130° C. Usually the polymerization is carried out at a pressure of from $10^5$ to $100 \times 10^5$ Pa, preferably from $10 \times 10^5$ to $55 \times 10^5$ Pa.

It may be advantageous to add an additional amount of diluent (D) as defined above to the subsequent polymerization reactor.

According to an alternative version of the process according to the invention, this amount of diluent is added to the concentrated suspension before it enters the subsequent polymerization reactor. Advantageously, this amount of diluent is added to the concentrated suspension during the pressure relief.

It goes without saying that, in polymerization step (e), apart from the olefin(s) and the diluent, other compounds may be present, especially cocatalysts and agents for controlling the molecular mass, such as hydrogen.

According to an alternative version of the process according to the invention, the polymerization carried out in step (e) is performed in several polymerization reactors connected in series.

After step (e) of the process according to the invention, a suspension (S') comprising diluent (D) and particles of an olefin polymer composition comprising polymer (A) and polymer (B) is obtained. Since polymer (B) was prepared in the presence of polymer (A), the olefin polymer composition may be characterized as being an intimate and homogenous mixture of the two polymers within each particle.

The respective amounts of olefin polymers produced in steps (a) and (e) of the process according to the invention may vary widely. In general, the amount of olefin polymer (A) formed in step (a) of the process is between 20 and 80% by weight, preferably between 30 and 70% by weight, of the total amount of olefin polymers produced by the process according to the invention. In general, the amount of olefin polymer (B) formed in step (e) of the process is between 20 and 80% by weight, preferably between 30 and 70% by weight, of the total amount of olefin polymers produced by the process according to the invention.

In step (f) of the process according to the invention, the suspension (S') is drawn off from the reactor and the particles of the olefin polymer composition are separated from the suspension (S'). The suspension (S') may be drawn off from the reactor by any known means, especially using a hydrocyclone separator.

The particles of the olefin polymer composition may be separated by any known method. The polymer particles are generally separated from most of the diluent by subjecting the suspension (S') coming from step (e) of the process according to the invention to a treatment under temperature and pressure conditions suitable for vaporizing at least some of the diluent. The polymer particles now containing only a small amount of residual diluent may then be dried by any known means, for example by heating them in a dryer.

According to a first version of step (f) of the process according to the invention, the pressure on the suspension (S') is relieved to a pressure of less than $5 \times 10^5$ Pa. The vaporized diluent can then be recondensed by compression for the purpose of reusing it in the process according to the invention. Before it is reused, the diluent is usually purified so as to remove most of the olefin and possibly the other components present. After purification, the diluent can be reused in steps (a), (c) and/or (e) of the process according to the invention.

According to a second version of step (f) of the process according to the invention, the suspension (S') undergoes a pressure relief under temperature and pressure conditions which ensure that most of the diluent vaporizes, but which are such that the subsequent cooling of the vaporized diluent to a temperature of less than or equal to 60° C. allows it to be recondensed without any compression. The temperature at which the pressure is relieved is generally between 50 and 90° C. In order to adjust the temperature at which the pressure is relieved, it may be advantageous to heat the suspension (S') drawn off from the reactor by means of a line heater. The pressure is generally relieved to between $5 \times 10^5$ and $20 \times 10^5$ Pa. This version of the process has the advantage that the diluent thus separated from the polymer particles may be recondensed by simply cooling it without a compression step and can be reused in step (a), (c) and/or (e) of the process according to the invention. This second version of step (f) of the process is highly advantageous when a diluent is used which has a boiling point at atmospheric pressure which is less than approximately 2520 C.

The process according to the invention has the advantage that it allows the polymerization mixture in each reactor of a series of reactors placed in series to be independently controlled better. The process according to the invention makes it possible, in a simple and effective manner, to remove, from the polymerization mixture withdrawn from the first reactor, some of the compounds that are not desirable in the subsequent reactor. In addition, the process according to the invention makes it possible to considerably reduce the amounts of compounds to be removed from the polymerization mixture before being able to introduce it into the subsequent polymerization reactor. In this way, the amount of these compounds to be treated is greatly reduced.

The process according to the invention furthermore has the advantage that it makes it possible to obtain polymers having a narrower particle size distribution and greater homogeneity in their rheological properties.

The process according to the invention is applicable to the production of an olefin polymer, more especially ethylene polymer, composition. The process is very suitable for obtaining an ethylene polymer composition comprising a polymer (A) and a polymer (B) having a different comonomer content and a different molecular mass. The process is particularly well suited for obtaining a composition comprising, as polymer (A), an ethylene homopolymer and, as polymer (B), an ethylene copolymer containing from 0.4 to 10% by weight of butene and/or of hexene. The process is also well suited for obtaining a composition comprising, as polymer (A), an ethylene copolymer containing from 0.4 to 10% by weight of butene and/or of hexene and, as polymer (B), an ethylene polymer containing less than 0.4% by weight of butene and/or of hexene.

The invention also relates to a plant used for carrying out the process described above, comprising at least two continuously operating polymerization reactors connected in series, a hydrocyclone separator, a device for drawing off the concentrated suspension (CS), a circuit for recycling the stream (F) to the reactor, and a device used for separating the particles of the olefin polymer composition from the suspension (S').

As polymerization reactor, it is possible to use any continuously operating reactor, such as reactors of the stirred-vessel type or reactors of the loop type. Good results have been obtained with loop reactors.

In the process according to the invention, the stream (S) may be drawn off from the hydrocyclone separator and recycled to the reactor by benefiting from a pressure difference obtaining in the polymerization reactor. More particularly, when the polymerization reactor is a reactor of the loop type, the suspension (S) may be drawn off from the reactor and the stream (F) may be recycled to the reactor by benefiting from the pressure difference obtaining downstream and upstream of the system for stirring the loop reactor. However, it is preferred to draw off the stream (F) from the hydrocyclone separator by creating a pressure difference upstream and downstream of the hydrocyclone separator by means of a circulating pump. The pump is preferably mounted in the circuit for recycling the stream (F) to the reactor.

The plant according to the invention also preferably includes a device used for adding liquid (L), allowing the suspension coming from step (b) of the process according to the invention to be diluted.

The plant according to the invention also preferably includes a device used for relieving the pressure on the concentrated suspension (CS) drawn off from the hydrocyclone separator.

BRIEF DESCRIPTIONS OF THE DRAWINGS

Figure 2:
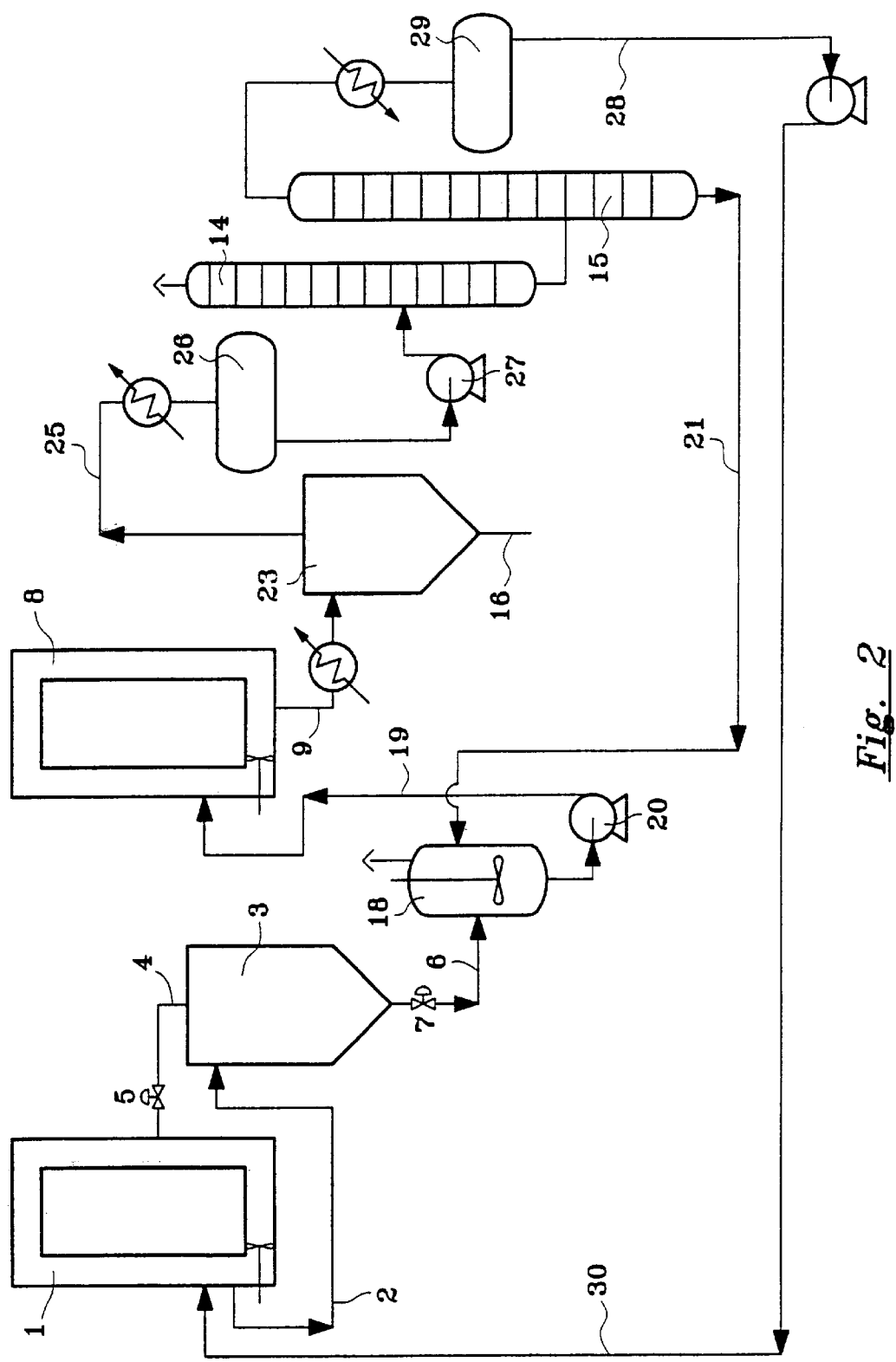
Figure 3:
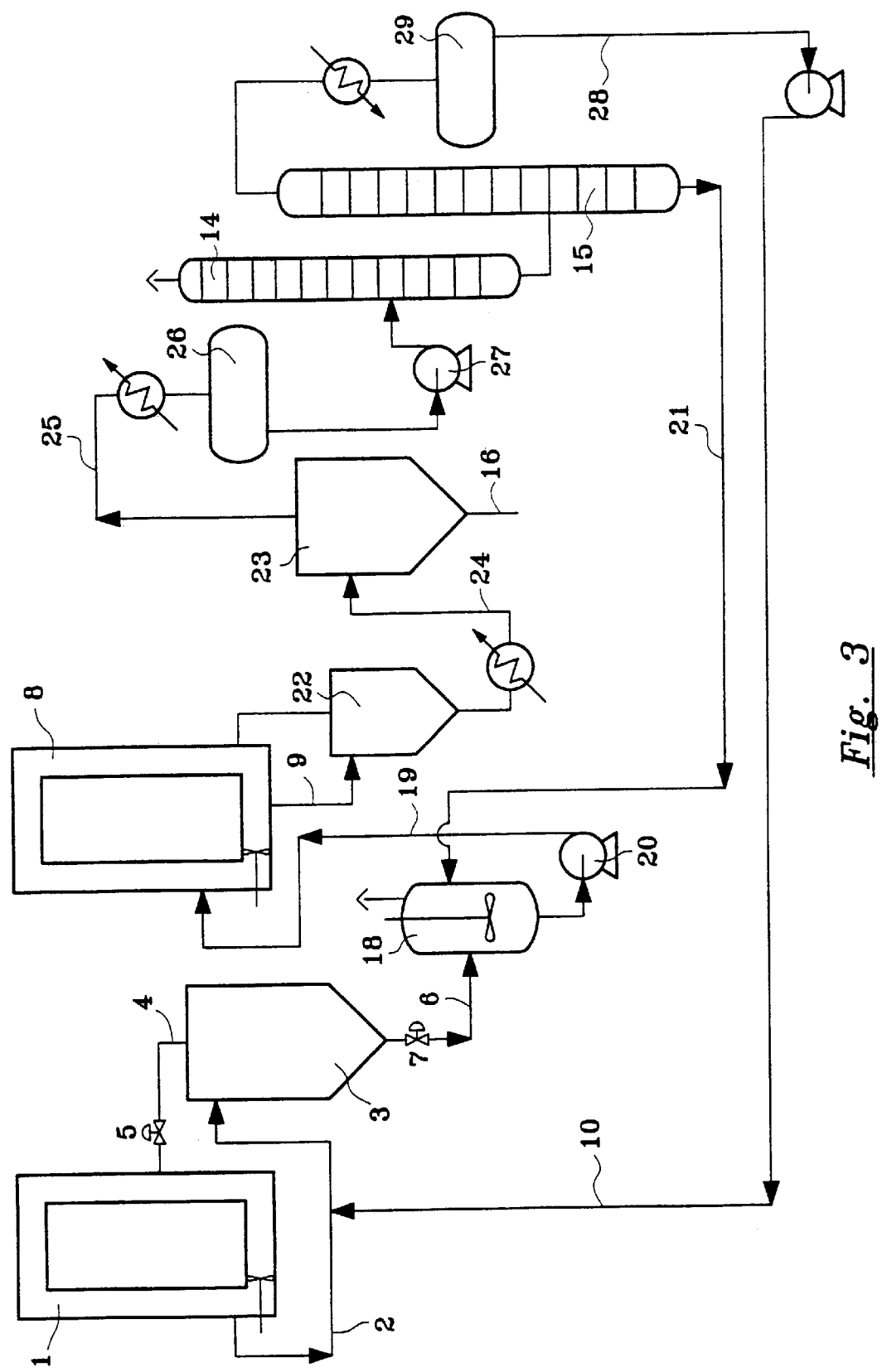

FIGS. 1 to 3 show schematically a plant that can be used for carrying out the process according to the invention.

In the diagrams in FIGS. 1 to 3, some of the suspension, comprising polymer particles and diluent, which is formed in the polymerization reactor 1 is drawn off via the line 2 and sent into the hydrocyclone separator 3 in which, on the one hand, a concentrated suspension of polymer particles which is drawn off from the hydrocyclone separator 3 via the valve 7 mounted in the line 6 and, on the other hand, a stream (F) enriched with diluent are formed. This stream (F) enriched with diluent is drawn off from the hydrocyclone separator 3 via the line 4 and recycled to the polymerization reactor 1.

Opening the control valve 5 mounted in the line 4 allows the degree of thickening of the concentrated suspension to be conditioned. Controlling the amount of the stream (F) recycled to the reactor makes it possible to adjust the concentration of polymer particles present in the polymerization reactor. It is therefore possible to work at relatively low polymer concentrations in the polymerization reactor while maintaining a high polymer concentration at the output end of the process.

In the diagram in FIG. 1, the suspension drawn off from the polymerization reactor 1 is diluted in line 10 by means of recycled diluent before it is sent to the hydrocyclone separator 3. The concentrated suspension drawn off from the hydrocyclone separator 3 via the line 6 is sent into the polymerization reactor 8. The suspension, comprising polymer particles formed in the reactors 1 and 8 and diluent, which is drawn off from the reactor 8 via the line 9 is sent into a tank 11 maintained at a pressure of less than that obtaining in the reactor 8 (generally less than $5 \times 10^5$ Pa) so as to vaporize therein most of the diluent. Next, the vaporized diluent is sent via the line 12 to a compressor 13 so as to condense it by compression. The diluant thus condensed is then sent to the distillation columns 14 and 15 so as to purify it. The diluant, greatly depleted in monomer, is then reused as diluant in the polymerization reactor 8 and for diluting the suspension drawn off from the reactor 1 (via the lines 17 and 10). The diluant, possibly still comprising a large amount of monomer, is then reused as diluant in the polymerization reactor 1. The particles of the polymer composition are drawn off via the line 16.

In the diagram in FIG. 2, the suspension drawn off from the polymerization reactor 1 is sent to the hydrocyclone separator 3. The concentrated suspension drawn off from the hydrocyclone separator 3 via the line 6 is sent into a pressure relief tank 18 maintained at a pressure less than that obtaining in the hydrocyclone separator (generally about $1 \times 10^5$ to $15 \times 10^5$ Pa). The concentrated suspension is diluted in the pressure relief tank 18 by means of recycled diluant via the line 21. The suspension is then drawn off from the pressure relief tank 18 via the line 19 by means of a pump 20 and introduced into the polymerization reactor 8. The suspension, comprising particles of the polymer composition formed in the reactors 1 and 8 and diluant, which is drawn off from the reactor 8 via the line 9 is sent into a tank 23 maintained at a pressure of less than that obtaining in the reactor 8 (generally about $5 \times 10^5$ to $15 \times 10^5$ Pa) so as to vaporize therein most of the diluant. For this purpose, the line 9 may optionally be provided with a line heater. The vaporized diluant is then sent via the line 25 provided with a heat exchanger to a tank 26 so as to condense it, simply by cooling. The condensed diluant is then sent via the pump 27 to the distillation columns 14 and 15 so as to purify it. The diluant, highly depleted in monomer, is then recondensed by cooling in the tank 29 and sent to the polymerization reactor 1 (via the lines 28 and 30). The diluant, possibly still comprising a large amount of monomer, is then recycled into the pressure relief tank 18 via the line 21. The polymer particles are drawn off via the line 16.

In the diagram in FIG. 3, the suspension drawn off from the polymerization reactor 1 is diluted in the line 10 by means of recycled diluant before it is sent to the hydrocyclone separator 3. The concentrated suspension drawn off from the hydrocyclone separator 3 via the line 6 is sent into a pressure relief tank 18 maintained at a pressure less than that obtaining in the hydrocyclone separator (generally about $1 \times 10^5$ to $15 \times 10^5$ Pa). The concentrated suspension is diluted by means of recycled diluant via the line 21 and drawn off from the pressure relief tank 18 via the line 19 by means of a pump 20, before being introduced into the polymerization reactor 8. The suspension, comprising particles of the polymer composition formed in the reactors 1 and 8 and diluant, which is drawn off from the reactor 8 via the line 9 is concentrated in a hydrocyclone separator 22 and then sent, via the line 24, into a tank 23 maintained at a pressure less than that obtaining in the hydrocyclone separator 22 (generally about $5 \times 10^5$ to $15 \times 10^5$ Pa) so as to vaporize therein most of the diluant. For this purpose, the line 24 may optionally be provided with a line heater. The vaporized diluant is then sent via the line 25 provided with a heat exchanger to a tank 26 so as to condense it, simply by cooling. The condensed diluant is then sent via the pump 27 to the distillation columns 14 and 15 so as to purify it. The diluant, highly depleted in monomer, is then recondensed by cooling in the tank 29 and reused as diluant for diluting the suspension drawn off from the reactor 1 (via the lines 10 and 28). The diluant, still possibly containing a large amount of monomer, is then recycled into the pressure relief tank 18 via the line 21. The polymer particles are drawn off via the line 16.

EXAMPLE 1

A polymerization trial was carried out using the process according to the invention and in the plant described in FIG. 1. Ethylene and hexene were continuously polymerized in the loop reactor 1 charged with isobutane, by means of a Ziegler-type catalyst, as described in Patent Application EP-A-0 897 934, so as to form a suspension comprising about 49% by weight of particles of an ethylene/hexene copolymer. The temperature in the reactor 1 was about 75° C. and the pressure was about $40 \times 11^5$ Pa. The reactor was fed continuously with ethylene and with hexene at a rate of 10 tonnes/h and 1 tonne/h, respectively. Some of the suspension of copolymer particles formed in the reactor 1 was continuously drawn off from the reactor 1 via the line 2 at a rate of 20.5 tonnes/h. This suspension was continuously diluted with isobutane recycled from the distillation column 15 (via the lines 17 and 10) at a rate of 6 tonnes/h. The suspension thus diluted comprised approximately 38% by weight of copolymer particles. It was sent continuously into the hydrocyclone separator 3. The operation of the hydrocyclone separator was controlled by means of the control valves 5 and 7 so as to obtain a stream (F) leaving the hydrocyclone separator via the line 4 at a rate of 9.3 tonnes/h and a concentrated suspension leaving the hydrocyclone separator via the line 6 at a rate of 17.2 tonnes/h. The stream (F) was entirely recycled to the polymerization reactor 1; it essentially comprised isobutane and hexene (3% by weight). The concentrated suspension comprised 58% by weight of copolymer particles. The concentrated suspension was introduced into a loop reactor 8. The loop reactor was continuously fed with ethylene and with isobutane recycled from the distillation column 15 (via the line 17) at a rate of 10 tonnes/h and 13 tonnes/h, respectively. The hexene concentration in the reactor 8 was approximately 0.5% by weight. The temperature in the reactor 8 was about 85° C. and the pressure was about $39 \times 10^5$ Pa. Some of the suspension of particles of the polymer composition formed was continuously drawn off from the reactor 8 via the line 9 at a rate of 40.6 tonnes/h. This suspension comprised about 49% by weight of particles of a composition comprising an ethylene/hexene copolymer and an ethylene polymer. For an hourly production of 20 tonnes of polymer, the amounts of isobutane, ethylene and hexene to be separated from the polymer particles and to be treated, so as to reuse them, were approximately 20 tonnes/h, 0.5 tonnes/h and 0.1 tonnes/h, respectively.

EXAMPLE 2
(Not According to the Invention)

The process described in Example 1 was repeated except that the transfer into the hydrocyclone separator 3 was omitted. The suspension drawn off from the polymerization reactor 1, comprising approximately 49% by weight of copolymer particles, was sent directly into the polymerization reactor 8. The hexene concentration in the reactor 8 was approximately 1.2% by weight. Some of the suspension of particles of the polymer composition was continuously drawn off from the reactor 8 via the line 9 at a rate of 40.75 tonnes/h. This suspension comprised about 49% by weight of particles of a composition comprising an ethylene/hexene copolymer and an ethylene polymer. For an hourly production of 20 tonnes of polymer, the amounts of isobutane, ethylene and hexene to be separated from the polymer particles and to be treated, so as to reuse them, were approximately 20 tonnes/h, 0.5 tonnes/h and 0.25 tonnes/h, respectively.

Comparing Examples 1 and 2 shows that the process according to the invention makes it possible to obtain a concentrated suspension of polymer particles having a greatly reduced hexene content. In this way, the amount of hexene introduced into the subsequent polymerization reactor is greatly reduced and therefore makes it possible to obtain, in this second reactor, an ethylene polymer lean in hexene. Likewise, the amount of hexene to be subsequently separated from the polymer particles and from the diluant is greatly reduced.

EXAMPLE 3

A polymerization trial was carried out using the process according to the invention and in the plant described in FIG. 2. Ethylene was continuously polymerized in the loop reactor 1 charged with isobutane, by means of a Ziegler-type catalyst, as in Example 1, so as to form a suspension comprising about 50% by weight of ethylene homopolymer particles. The temperature in the reactor was about 85° C. and the pressure was about $40 \times 10^5$ Pa. The reactor was continuously fed with ethylene and with hydrogen, at rates of 10 tonnes/h and 0.025 tonnes/h, respectively. Some of the suspension of polymer particles formed in the reactor 1 was continuously drawn off from the reactor 1 via the line 2 at a rate of approximately 20 tonnes/h. It was continuously sent into the hydrocyclone separator 3.

The operation of the hydrocyclone separator was controlled by means of the control valves 5 and 7 so as to obtain a stream (F) leaving the hydrocyclone separator via the line 4 at a rate of 3 tonnes/h and a concentrated suspension leaving the hydrocyclone separator via the line 6 at a rate of 17.162 tonnes/h. The suspension comprised, per 10 tonnes of polymer, 7 tonnes of isobutane, 2.2 kg of hydrogen and 160 kg of ethylene. The stream (F) was entirely recycled to the polymerization reactor 1; it essentially comprised isobutane. The concentrated suspension comprised 58% by weight of polymer particles. The concentrated suspension was introduced into the pressure relief tank 18 in which the pressure was about $10 \times 10^5$ Pa. Isobutane, recycled (via the line 21) from the distillation column 15, was introduced into the pressure relief tank at a rate of 13 tonnes/h. The suspension drawn off from the pressure relief tank 18 by means of the pump 20 was degassed and freed of almost all the hydrogen and ethylene present therein. The degassed suspension was then introduced into the loop reactor 8 via the pump 20 and the line 19. The loop reactor 8 was continuously fed with ethylene and with hexene at a rate of 10 tonnes/h and 0.56 tonnes/h, respectively. Some of the suspension of particles of the polymer composition was continuously drawn off from the reactor 8 via the line 9 at a rate of 42 tonnes/h. This suspension comprised about 50% by weight of particles of a composition comprising an ethylene homopolymer and an ethylene/hexene copolymer. For an hourly production of 20 tonnes of polymer, the amounts of isobutane and ethylene to be separated from the polymer particles and to be treated, so as to reuse them, were approximately 20 tonnes/h and 0.5 tonnes/h, respectively. For an hourly production of 20 tonnes of polymer, the amounts of ethylene and hydrogen leaving the pressure relief tank were 160 kg/h and 2.2 kg/h, respectively.

EXAMPLE 4
(Not According to the Invention)

The process described in Example 3 was repeated except that the transfer into the hydrocyclone separator 3 was omitted.

Some of the suspension of polymer particles formed in the reactor 1 was continuously drawn off from the reactor 1 via the line 2 at a rate of approximately 20 tonnes/h. The suspension, comprising 10 tonnes of polymer, 10 tonnes of isobutane, 3.2 kg of hydrogen and 225 kg of ethylene, was introduced into the pressure relief tank 18 in which the pressure was about $10 \times 10^5$ Pa. Isobutane, recycled (via the line 21) from the distillation column 15, was introduced into the pressure relief tank at a rate of 10 tonnes/h. The suspension drawn off from the pressure relief tank 18 by means of the pump 20 was degassed and freed of almost all the hydrogen and ethylene present therein.

For an hourly production of 20 tonnes of polymer, the amounts of ethylene and hydrogen leaving the pressure relief tank were 225 kg/h and 3.2 kg/h, respectively.

EXAMPLE 5

A polymerization trial was carried out using the process according to the invention and in the plant described in FIG. 3. Ethylene was continuously polymerized in the loop reactor 1 charged with isobutane, by means of a Ziegler-type catalyst as in Example 1, so as to form a suspension comprising about 50% by weight of ethylene homopolymer particles. The temperature in the reactor was about 85° C. and the pressure was about $40 \times 10^5$ Pa. The reactor was continuously fed with ethylene and with hydrogen at rates of 10 tonnes/h and 0.025 tonnes/h, respectively. Some of the suspension of polymer particles formed in the reactor 1 was continuously drawn off from the reactor 1 via the line 2 at a rate of approximately 20 tonnes/h. It was diluted by means of recycled isobutane coming from the distillation column 15 via the line 10 at a rate of 7 tonnes/h. The suspension thus diluted was continuously sent into the hydrocyclone separator 3. The operation of the hydrocyclone separator was controlled by means of the control valves 5 and 7 so as to obtain a stream (F) leaving the hydrocyclone separator via the line 4 at a rate of 10 tonnes/h and a concentrated suspension leaving the hydrocyclone separator via the line 6 at a rate of 17.091 tonnes/h. The concentrated suspension comprised, per 10 tonnes of polymer, 7 tonnes of isobutane, 1.3 kg of hydrogen and 90 kg of ethylene. The stream (F) was entirely recycled to the polymerization reactor 1; it essentially comprised isobutane. The concentrated suspension comprised 59% by weight of polymer particles. The concentrated suspension was introduced into the pressure relief tank 18 in which the pressure was about $10 \times 10^5$ Pa. Isobutane, recycled (via the line 21) from the distillation column 15, was introduced into the pressure relief tank at a rate of 7 tonnes/h. The suspension drawn off from the pressure relief tank 18 by means of the pump 20 was degassed and freed of almost all the hydrogen and ethylene present therein. The degassed suspension was then introduced into the loop reactor 8 via the pump 20 and the line 19. The loop reactor 8 was continuously fed with ethylene and with hexene at a rate of 10 tonnes/h and 0.56 tonnes/h, respectively. Some of the suspension of polymer particles was continuously drawn off from the reactor 8 via the line 9 at a rate of 42 tonnes/h.

This suspension was concentrated in the hydrocyclone separator 22. The concentrated suspension comprised about 59% by weight of particles of a composition comprising an ethylene homopolymer and an ethylene/hexene copolymer. For an hourly production of 20 tonnes of polymer, the amounts of isobutane and of ethylene to be separated from the polymer particles and to be treated, so as to reuse them, were approximately 14 tonnes/h and 0.35 tonnes/h, respectively. For an hourly production of 20 tonnes of polymer, the amounts of ethylene and hydrogen leaving the pressure relief tank were 90 kg/h and 1.3 kg/h, respectively.

Comparing Examples 3, 4 and 5 shows that, for the same hourly production of polymer, the process according to the invention makes it possible to considerably reduce the amounts of hydrogen and ethylene to be separated from the polymer particles leaving the first reactor and to be treated so as to reuse them in the process.

What is claimed is:

1. Process for manufacturing an olefin polymer composition in at least two polymerization reactors connected in series, in which:
    (a) at least one olefin is continuously polymerized in a first polymerization reactor in the presence of a diluent (D) and of a catalyst in order to produce a suspension (S) comprising the said diluent (D) and particles of an olefin polymer (A);
    (b) some of the suspension (S) is drawn off from the reactor;
    (c) the suspension drawn off is sent into a hydrocyclone separator in which, on the one hand, a stream (F) comprising diluent (D) and, on the other hand, a concentrated suspension (CS) of particles of polymer (A) are formed and separated;
    (d) the stream (F) is drawn off from the hydrocyclone separator and at least partially recycled to the first polymerization reactor;
    (e) the concentrated suspension (CS) is drawn off from the hydrocyclone separator and introduced into a subsequent polymerization reactor in which at least one olefin is polymerized in order to form an olefin polymer (B) and to produce a suspension (S') comprising the diluant (D) and particles of an olefin polymer composition comprising polymer (A) and polymer (B);
    (f) the suspension (S') is drawn off from the subsequent polymerization reactor and the particles of the olefin polymer composition are separated from the suspension (S').

2. Process according to claim 1, wherein the suspension (S) is diluted in step (c) by means of a liquid (L) before it is introduced into the hydrocyclone separator.

3. Process according to claim 2, wherein the liquid (L) consists essentially of diluant (D).

4. Process according to claim 1, wherein the diluent (D) is an acyclic aliphatic hydrocarbon containing from 3 to 8 carbon atoms.

5. Process according to claim 4, wherein the diluent (D) is isobutane or propane.

6. Process according to claim 1, wherein in step (e), the pressure on the concentrated suspension (CS) drawn off from the hydrocyclone separator is firstly relieved before the suspension is introduced into the subsequent polymerization reactor.

7. Process according to claim 1, wherein the suspension (S') resulting from step (e) is subjected in step (f) to a treatment under temperature and pressure conditions which ensure that at least some of the diluent (D) vaporizes.

8. Process according to claim 7, wherein the diluent (D) is vaporized under temperature and pressure conditions such that the subsequent cooling of the diluant to a temperature of less than or equal to 60° C. allows it to be recondensed without any compression.

9. Process according to claim 1, wherein the process is applied to the production of a composition comprising an ethylene polymer (A) and an ethylene polymer (B) having a different comonomer content and a different molecular mass.

10. Process according to claim 9, wherein polymer (A) is an ethylene homopolymer and in that polymer (B) is an ethylene copolymer containing from 0.4 to 10% by weight of butene and/or of hexene.

11. Process according to claim 9, wherein polymer (A) is an ethylene copolymer containing from 0.4 to 10% by weight of butene and/or of hexene and in that polymer (B) is an ethylene polymer containing less than 0.4% by weight of butene and/or of hexene.

12. Plant for the implementation of the process according to claim 1, comprising at least two continuously operating polymerization reactors connected in series, a hydrocyclone separator, a device for drawing off the concentrated suspension (CS), a circuit for recycling the stream (F) to the reactor, and a device used for separating the particles of the olefin polymer composition from the suspension (S').

13. Plant according to claim 12, which includes a circulating pump mounted in the circuit for recycling the stream (F) to the reactor.

14. Plant according to claim 12, which includes a device used for adding liquid (L).

15. Plant according to claim 12, which includes a device used for relieving the pressure on the concentrated suspension (CS) drawn off from the hydrocyclone separator.

* * * * *